United States Patent
Agrawal et al.

(10) Patent No.: US 7,261,300 B2
(45) Date of Patent: Aug. 28, 2007

(54) HYDRODYNAMIC FOIL FACE SEAL

(75) Inventors: Giridhari L. Agrawal, Simsbury, CT (US); Kirtikumar H. Patel, Berlin, CT (US); John H. Munson, Indianapolis, IN (US)

(73) Assignee: R & D Dynamics Corporation, Bloomfield, CT (US)

( * ) Notice: Subject to any disclaimer, the term of this patent is extended or adjusted under 35 U.S.C. 154(b) by 51 days.

(21) Appl. No.: 10/486,647

(22) PCT Filed: Jul. 3, 2002

(86) PCT No.: PCT/US02/21191

§ 371 (c)(1),
(2), (4) Date: Feb. 11, 2004

(87) PCT Pub. No.: WO03/004911

PCT Pub. Date: Jan. 16, 2003

(65) Prior Publication Data

US 2004/0207158 A1    Oct. 21, 2004

Related U.S. Application Data

(60) Provisional application No. 60/303,588, filed on Jul. 6, 2001.

(51) Int. Cl.
*F16J 15/34* (2006.01)
*F16C 32/06* (2006.01)
(52) U.S. Cl. .............. 277/399; 277/400; 277/411; 384/105; 384/106; 384/124
(58) Field of Classification Search .......... 277/411, 277/399, 400; 384/105, 106, 122, 124
See application file for complete search history.

(56) References Cited

U.S. PATENT DOCUMENTS

| | | | | |
|---|---|---|---|---|
| 3,382,014 A | * | 5/1968 | John | ............ 384/106 |
| 3,635,534 A | * | 1/1972 | Barnett | ............ 384/106 |
| 4,227,752 A | | 10/1980 | Wilcock | |
| 4,296,976 A | * | 10/1981 | Heshmat | ............ 384/99 |
| 4,462,700 A | | 7/1984 | Agrawal | |
| 4,621,930 A | | 11/1986 | Gu et al. | |
| 4,654,939 A | | 4/1987 | Silver | |
| 4,682,900 A | | 7/1987 | Gu | |
| 5,246,295 A | | 9/1993 | Ide | |
| 5,318,366 A | * | 6/1994 | Nadjafi | ............ 384/106 |

(Continued)

OTHER PUBLICATIONS

International Search Report for PCT/US02/21191 dated Aug. 1, 2003.

(Continued)

*Primary Examiner*—Alison K. Pickard
(74) *Attorney, Agent, or Firm*—Cantor Colburn LLP

(57) ABSTRACT

A foil thrust bearing forms the primary rotating interface for a film riding face seal. This face seal includes a spring system that will allow the entire assembly to translate axially relative to a static attachment. The complete assembly will form a hybrid foil/film riding face seal that shows much promise at being sufficiently flexible to enable operation in a gas turbine engine. The seal includes a flexible top plate having a non-flat surface under its working conditions, and a spring support system to allow the top plate to accommodate axial excursions and out-of-flat distortions.

17 Claims, 4 Drawing Sheets

U.S. PATENT DOCUMENTS

| | | | |
|---|---|---|---|
| 5,531,458 | A | 7/1996 | Sedy |
| 5,634,723 | A | 6/1997 | Agrawal |
| 5,769,604 | A | 6/1998 | Gardner et al. |
| 5,833,369 | A * | 11/1998 | Heshmat .................... 384/105 |
| 5,911,511 | A | 6/1999 | Saville |
| 5,938,341 | A | 8/1999 | Eccles |
| 6,007,068 | A | 12/1999 | Dellacorte |
| 6,045,134 | A | 4/2000 | Turnquist et al. |
| 6,173,958 | B1 | 1/2001 | Dinc et al. |
| 6,196,790 | B1 | 3/2001 | Sheridan et al. |
| 6,220,814 | B1 | 4/2001 | Brushwood et al. |
| 6,261,002 | B1 * | 7/2001 | Ermilov et al. ............ 384/105 |
| 6,375,438 | B1 | 4/2002 | Seo |
| 2006/0062499 | A1 * | 3/2006 | Boyd ........................ 384/100 |
| 2006/0171617 | A1 * | 8/2006 | Cross et al. ................ 384/122 |

OTHER PUBLICATIONS

European Patent Office Communication Pursuant to Article 96(2) EPC, dated Jan. 31, 2005, for European Application No. 02 756 377.4-1252 of R & D Dynamics Corporation, 5 pages.

Norman A. Turnquist et al., "Analysis and Full Scale Testing of an Aspirating Face Seal With Improved Flow Isolation", AIAA-98-3285, 34th AIAA/ASME/SAE/ASEE Joint Propulsion Conference, Jul. 13-15, 1998/Cleveland, Ohio, pp. 1-11.

J. Munson et al., "Foil Face Seal Development", AIAA 2001-3483, 37th AIAA/ASME/SAE/ASEE Joint Propulsion Conference, Jul. 8-11, 2001, Salt Lake City, Utah, pp. 1-10.

R.C. Hesje and R.A. Peterson, "Mechanical Dry Seal Applied to Pipeline (Natural Gas) Centrifugal Compressors", ASME-ASLE 1984 Joint Lubr. Conf., Preprint 84-GT-3, pp. 1-7.

J. Munson and G. Pecht, "Development of Film Riding Face Seals for a Gas Turbine Engine", STLE Tribology Transactions, vol. 35, 1992, 1, pp. 65-70.

Giridhari L. Agrawal, "Foil Air/Gas Bearing Technology—An Overview", 97-GT-347, Presented at the International Gas Turbine & Aeroengine Congress & Exhibition, Orlando, Florida, Jun. 2-5, 1997, pp. 1-11.

Peter Lynwander, "Self-Acting Seals For Helicopter Engines", AVCO Lycoming Division, Prepared for National Aeronautics and Space Administration, NASA-CR-134940, N76-18123, Oct. 1975, Contract NAS 3-18015.

L.J. Dobeck, "Development of Mainshaft Seals For Advanced Air Breathing Propulsion Systems", Pratt & Whitney Aircraft Division of United Aircraft Corporation, Prepared for National Aeronautics and Space Administration, NASA-C121177, N73-27415, Mar. 1973, Contract NAS 3-15346.

Peter Lynwander, "Development of Helicopter Engine Seals", AVCO Lycoming Division, Prepared for National Aeronautics and Space Administration, NASA-CR-134647, N74-28229, Nov. 1973, Contract NAS 3-16720.

Michael O'Brien, "Development of a Short-Length Self-Acting Seal", AVCO Lycoming Division, Prepared for National Aeronautics and Space Administration, NASA-CR-135159, X77-10091, Nov. 1976, Contract NAS 3-19420.

Copy of European Search Report for European Patent Application No. 02756377.4-1252, dated Jul. 27, 2004., 3 pages.

Copy of PCT Written Opinion for PCT/US02/21191, dated Aug. 20, 2004, 5 pages.

* cited by examiner

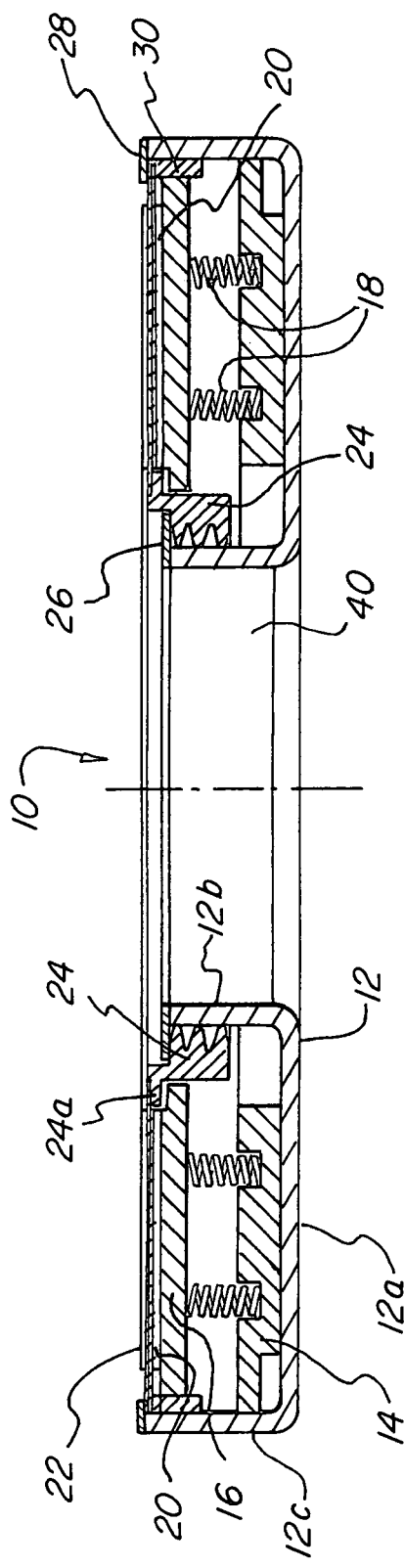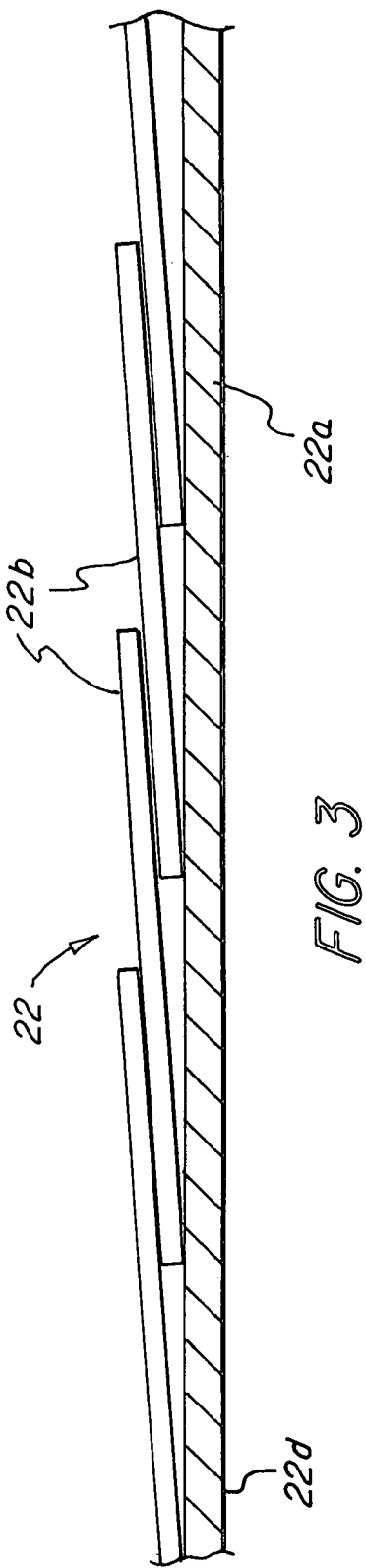

HYDRODYNAMIC FOIL FACE SEAL

CROSS-REFERENCE TO RELATED APPLICATIONS

This application claims the benefit of U.S. Provisional Application Ser. No. 60/303,588, filed Jul. 6, 2001.

BACKGROUND OF THE INVENTION

1. Field of the Invention

This invention pertains to the field of gas riding face seals.

Gas turbine engines bleed off some of the compressed air from the primary gas path into so-called secondary flow circuits for various reasons, mainly to cool various components within the engine. This withdrawal of air is a parasitic loss to the engine thermodynamic cycle causing degradation in efficiency.

Secondary airflows are metered via air-to-air seals that are typically placed at interstage locations in the turbine engine. Relative velocities are high, typically about 150 meters/second (about 500 ft/sec) and up, and temperatures in the turbine section of the engine of about 425° C. (about 800° F.) and greater are typical. Since the beginning of the gas turbine, labyrinth seals have traditionally been used to seal these locations. Unfortunately, large thermal gradients, particularly during start up and shut down, result in considerable radial and axial excursions between the rotating and stationary parts of the seals. This makes it difficult to minimize operating clearances and so leakage through these seals, and the associated power loss, is usually significant.

It has been known for some time that if better seals were available engine performance could be substantially improved. See, for example, J. Munson and G. Pecht. "Development of Film Riding Face Seals for a Gas Turbine Engine." STLE Tribology Transactions. V35 (1992). 1, 65-70. This reference shows that the use of just three advanced seals could reduce direct operating cost of a modem regional jet by almost 1%. This substantial benefit was the result of reduced fuel consumption and reductions in chargeable maintenance while producing the same power output at a lower turbine inlet temperature than an engine with conventional seals. In order to achieve these benefits it was necessary to place advanced mechanical seals very near to the blade/vane gaps in the high pressure turbine. Munson et al goes on to indicate that these locations are among the most difficult to seal because of the speed, temperatures, large excursions, and the inability to keep parts flat due to the large thermal gradients which characterize these locations. Munson et al provides a table of expected deflections and distortions at the three advanced seal locations along with speeds, temperatures, and differential pressure range.

2. Related Art

Efforts to provide improved seals for use in gas turbines and other applications have led to the production of abradable coatings for labyrinth seal stators and variations of labyrinth tooth geometry, and to the development of brush seals. These seals attempt to provide a labyrinth seal tooth with some compliance. The compliance allows the seals to track radial clearance excursions with only minimal wear of the seal. Leakage thus remains lower for a longer time relative to a labyrinth seal operating at the same location.

Over the past thirty years, several researchers tried to adapt mechanical face seals for use as advanced secondary air seals. Probably the earliest large effort in this direction is that described by L.S. Dobeck in an article entitled "Development of Mainshaft Seals for Advanced Air Breathing Propulsion Systems," Pratt & Whitney Aircraft, NASA CR-121177 (1973). The focus of this effort was to modify the oil-cooled face seals already in use in engine bearing sumps to a configuration that did not require oil cooling. This program introduced the film-riding or gas-lubricated face seal. Later efforts followed, for example, see P. Linwander, "Development of Helicopter Engine Seals," AVCO-Lycoming, NASA CR-134647 (1973) and "Self-Acting Seals for Helicopter Engines, AVCO-Lycoming. NASA CR-134940 (1975); M. O'Brien, "Development of a Short Length Self-Acting Seal," AVCO-Lycoming. NASA CR-135159 (1976); and the 1992 J. Munson and G. Pecht article noted above. The work describes efforts to increase both the stiffness of the gas films and the demonstrated operating conditions. New lift features such as spiral grooves, etc., are described and new materials such as silicon carbide are introduced to overcome temperature limitations of carbon graphite.

More recently, J. F. Gardner et al U.S. Pat. No. 5.769,604 describes a double spiral groove hydrostatic-type seal. If one or both of the seal faces should experience a conical distortion in operation, these spiral grooves would tend to produce a moment on the seal faces in the opposite direction. To take advantage of this righting moment the stationary or primary seal ring has deliberately been made thin and flexible, the remainder of the seal follows typical face seal design practice. The intent of this design is to allow the hydrostatic seal to self-compensate for expected in-service conical distortion and thus potentially extend its useful operational envelope. The concept is currently under development.

The devices described in the aforementioned references describe hydrodynamic face seal designs. These rely primarily on the relative rotation of the seal faces to generate the lift force that separates the seal faces. The conclusion from review of this work is that the thin gas films that characterize this type of seal allow almost no distortion of the seal faces. In other words, even minute distortions in the seal faces must be prevented if adequate performance is to be achieved. In applications where this can be guaranteed successful applications result. For example, hydrodynamic designs have come to dominate the gas pipeline and process industry applications where distortion can be controlled, as described by P. E. Hesie and R. A. Peterson. "Mechanical Dry Seal Applied to Pipeline (Natural Gas) Centrifugal Compressors," ASME-ASLE 1984 Joint Lubr. Conf., Preprint 84-GT-3. Where this cannot be guaranteed, such as inside a gas turbine engine, success has proved elusive.

Hydrostatic seals provide an alternative to hydrodynamic face seal designs. These only need an applied differential pressure. Hydrostatic designs work best with thin gas films, on the order of 0.0001 inch, but they can also operate with 10 times this film thickness. This increases the acceptable amount of distortion that the seal can tolerate without contact between the relatively rotating seal faces.

Turnquist, Tseng et al describes the development of a large hydrostatic face seal for use in an aircraft gas turbine engine in "Analysis and Full Scale Testing of an Aspirating Face Seal With Improved Flow Isolation", 34th AIAA/ASME/SAE/ASEE Joint Propulsion Conference, Jul. 13-15. 1988, Cleveland, Ohio. The thick gas film allows the seal to cope with the expected distortion levels of the seal faces when operated in the engine. Leakage through this type of hydrostatic seal is much higher than that which would be expected from an equivalent diameter hydrodynamic face seal. However, it is pointed out that leakage is much lower than that which can be obtained from any other potential seal type, and is still expected to provide over 1% savings in engine specific fuel consumption (SFC). During engine start and shutdown, differential pressure is sometimes insufficient to separate the seal faces. To overcome this an "aspirating" labyrinth seal tooth has been applied in parallel with the seal. This allows the seal to remain "open" (non-contacting) until sufficient differential pressure is available to support the seal faces. This seal has undergone considerable rig development testing. It has met all of its test objectives. It is to be ground tested in a gas turbine engine in the near future.

Although promising for some gas turbine applications, hydrostatic seals cannot be utilized when the surface speed is high, typically over 305 meters/second (m/s) (1000 ft/s).

Allison Engine Company conducted an extensive literature survey of foil bearing capability prior to committing to the hybrid seal concept. Approximately 375 citations were reviewed covering the period from 1990 to the present. Although no references to foil face seals were reported, the literature survey revealed the existence of an extensive foil journal and thrust air bearing design, test, and manufacturing base. The great advantage of the foil design over the fixed geometry designs is the conforming nature of the foils. These have been shown to accommodate thermal and dynamic shaft and housing deflections. When used in journal bearing applications they have also demonstrated the ability to prevent half-speed whirl indicating that they are capable of providing stable operation.

SUMMARY OF THE INVENTION

This invention provides an improvement in a gas riding face seal for mounting between mutually rotating structures. The improvement comprises a flexible top plate that has a generally undulate face surface at least when it is bearing an axial load, to generate a riding gas film, and support means for rendering the top plate compliant to out-of-flat distortions and axial excursions between the rotating parts while maintaining a gas seal between such rotating structures. Optionally, the top plate may have a generally undulate face surface, even when it is not bearing an axial load. The support means may comprise a primary spring system, for accommodating out-of-flat distortions, and a secondary spring system for accommodating axial excursions.

This invention also provides a face seal for mounting on a stationary structure and facing an adjacent rotating structure, the face seal comprising a flexible top plate having a generally undulate face surface and a support surface, a support spring system beneath the top plate support surface for supporting the top plate over a stationary structure and rendering the top plate compliant to out-of-flat distortions and axial excursions between the structures while maintaining a gas seal between the structures, and a ring seal secured to the top plate for establishing a seal between the face seal and the stationary structure.

According to one aspect of this invention, the spring system may comprise a support plate having two sides, a primary spring system on one side of the support plate, for accommodating axial excursions of the top plate, and a secondary spring system on the other side of the support plate, between the top plate and the support plate, for accommodating out of flatness distortion.

According to another aspect of this invention, the top plate may comprise a plurality of overlapping sector plates on the outward surface to provide ramped sectors. Optionally, the sector plates may be hingedly attached to the top plate. Alternatively, the top plate may comprise a plurality of sector plates on the face surface that are spaced from one another to define grooves between them.

According to another aspect of this invention, the seal further comprises a case for mounting sealingly onto the stationary structure and within which the top plate, the primary spring system, and the secondary spring system are mounted, and wherein the ring seal establishes a seal between the top plate and the case.

Optionally, the top plate may comprise a low-friction, low-wear surface.

BRIEF DESCRIPTION OF THE DRAWINGS

FIG. 2B is a cross-sectional view of the face seals of FIG. 2A, as assembled;

FIG. 3 is a schematic cross-sectional view of the top plate of the face seals of FIGS. 2A and 2B.

DETAILED DESCRIPTION OF THE INVENTION AND PREFERRED EMBODIMENTS THEREOF

Figure 1:
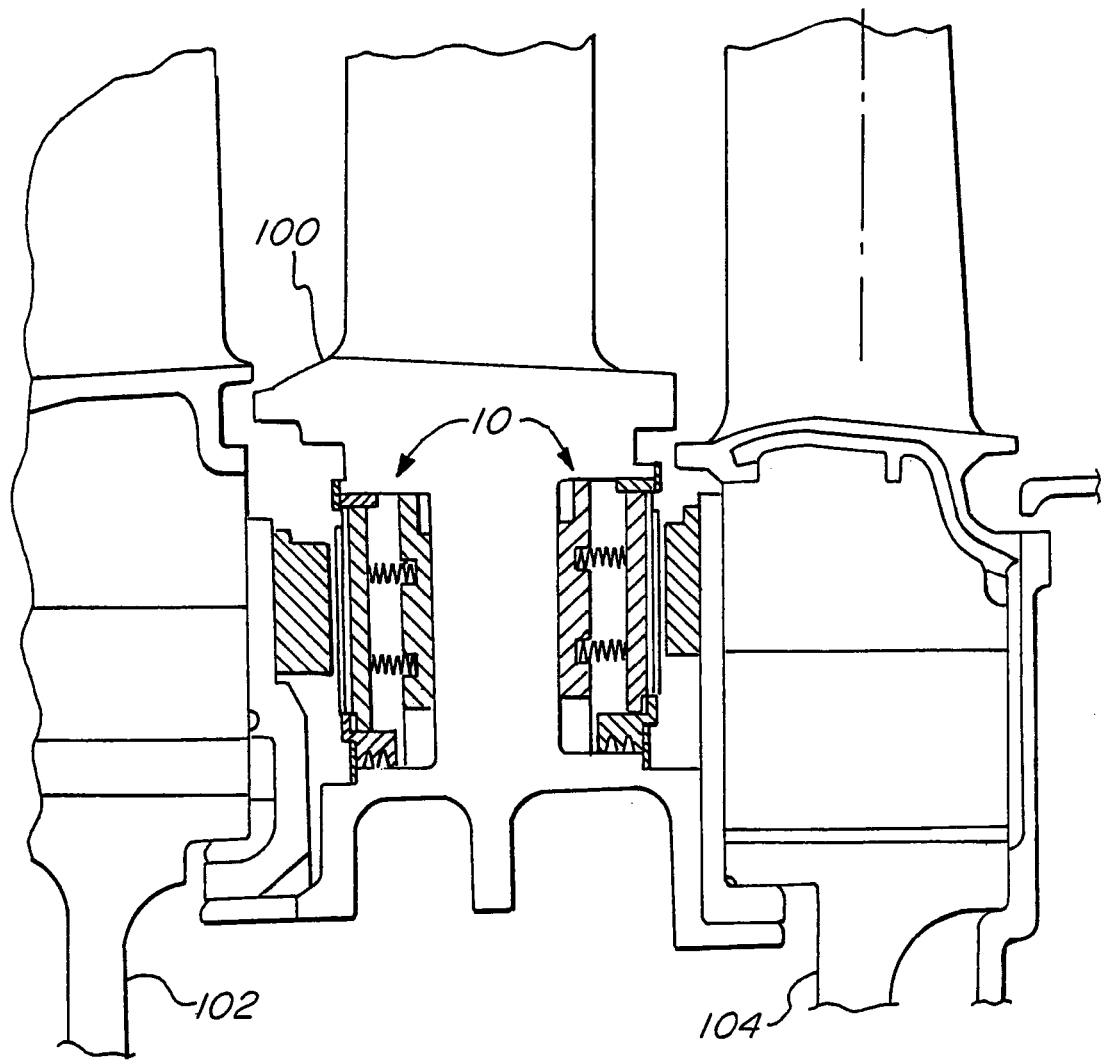
FIG. 1 is a schematic cross-sectional view of a static vane and two rotors adjacent thereto in a gas turbine and of portions of two face seals in accordance with this invention.

Gas film riding seals have found wide acceptance in pipeline and process industry turbomachinery. However, such seals have not found utility in gas turbine prime movers.

The gas turbine operating environment requires that the seals operate at relatively high surface velocities and higher temperatures than those of all other applications, and flight-worthy gas turbines must meet additional restrictions on the allowable size and weight of the seal. Furthermore, the structural portions of an aircraft engine are lightweight, which means that the seal cannot be completely isolated from the distortion of the surrounding structure. It is this last problem which more than anything else has prevented the use of film-riding bearings in gas turbine aircraft engines.

This invention provides a hydrodynamic foil face seal that is much better than prior art devices at accommodating axial excursions, misalignments, out-of-flatness, conical distortion and circumferential distortion. Such a face seal comprises a top plate having a seal face that has (at least when it is bearing an axial load) a generally undulate (i.e., not flat, but stepped, sinusoidal, etc.) surface as sensed rotationally, i.e., as sensed along a circular path on the surface of the seal face. The top plate has a seal face (i.e., an outward facing top surface) on one side, and a top plate support surface on the other. In addition, the top plate is flexible and the seal assembly is designed to accommodate axial misalignments, seal face distortions, and axial excursions between the seal and the rotating part it faces. As a result of the improved tolerance of the foil face seal of this invention for such deviations, the invention finds use in gas turbines, including aircraft engines.

Typically, a seal according to this invention is mounted on a stationary structure with the seal face disposed against, or adjacent to, an adjacent rotating structure. For ease of expression, the structure on which the seal is mounted will be referred to herein as the stationary structure, and the structure that the seal faces will be referred to as the rotating structure or "disc".

The seal of this invention has demonstrated an ability to handle seal face distortion far in excess of any other gas film riding seal. It can operate over a wide range of diameters and a wide range of pressure differentials and so can be used in a variety of locations within a turbine, e.g., about 30 to 46 cm (about 12 to 18 inches). A preliminary engine design study produced anticipated operating conditions for the seal at three selected turbine rim locations. The first location listed in TABLE I (location 1V-1B) is between the turbine inlet vane and the first stage turbine rotor. The second two locations (1B-2V, 2V-2B) seal a vane located between two turbine stages, as depicted schematically in FIG. 1 wherein foil seals 10, which do not include casings, are mounted in annular grooves in a turbine stage 100 to provide a dynamic seal relative to rotating vanes 102 and 104. This is a very common turbine sealing application. The anticipated operating conditions for such a device are presented in TABLE I.

TABLE I

Anticipated Turbine Rim Operating Conditions

| Location | 1V-1B | 1B-2V | 2V-2B |
|---|---|---|---|
| Temp.° C. (Max. Source) | 620 (1148° F.) | 598 (1108° F.) | 598 (1108° F.) |
| ΔP Max (atm) | 1.76 (25.9 psid) | 1.959 (28.8 psid) | 3.796 (55.8 psid) |
| ΔP Min (atm) | 0.0013 (0.02 psid) | 0.0388 (0.57 psid) | 0.427 (6.28 psid) |
| Conical Distortion (degree) | 0.13 | 0.32 | 0.52 |
| Circ. Out of Flat. (mm) | 0.762 (0.003 in) | 0.1016 (0.004 in) | 0.2286 (0.009 in) |
| Rel. Radial Excursion (mm) | 1.016-2.286 (0.04-0.09 in) | 2.032-3.302 (0.08-0.13 in) | 0.508-2.032 (0.02-0.08 in) |
| Rel. Axial Excursion (mm) | 1.016-5.08 (0.04-0.2 in) | -0.762-+0.099 (-0.03-+0.13 in) | -1.016-+4.826 (-0.04-+0.19 in) |
| Maximum Speed (m/s) | 350.5 (1150 ft/s) | 320 (1050 ft/s) | 320 (1050 ft/s) |

The ΔP max and ΔP min indicate the range of the pressure differential across the seal surface. The "conical distortion" (or "conical out of flat") indicates the angle formed by the top plate relative to a plane perpendicular to the axis of rotation. The "circular distortion" (or "circular out of flat") indicates the amount by which an edge of the seal deviates from a plane at right angles to the axis of rotation of the rotors. Radial excursion refers to movement of the rotor relative to the stationary vane in the direction along the axis of rotation. Axial excursion refers to the movement of the axis of rotation relative to the stationary vane. Maximum speed refers to the maximum velocity of the outer circumference of the foil seal. The conical and circular out-of-flat distortions, and the very low differential pressures that occur at certain points in the operating cycle, are parameters that a bearing in a gas turbine should accommodate, as well as high operating temperatures. Temperature is within the capability of existing materials.

This invention provides a face seal that can function within the foregoing parameters because the face comprises a flexible top plate or foil that will flex to accommodate out-of-flatness distortions of the seal mating disc that is supported in a manner to permit such flexure and to accommodate much larger axial excursions between the rotating and stationary portions as well.

As mentioned above, the top plate of a seal according to this invention has an uneven seal face, at least when it is subjected to an axial load. It is the non-flat configuration of the seal face relative to the disc that allows the seal to generate the gas film between them at sufficient rotational speed. The non-flat surface can be inherent on the top plate in its non-loaded configuration, or the top plate can have an initially flat face when at rest, but in such case, the seal must be configured to allow the top plate to deform into a non-flat configuration when subjected to an axial load from the disc. This can be achieved, for example, by providing a top plate with a normally flat face on a support plate that provides an irregular support surface.

The seal comprises a support spring system (i.e., one or more springs and associated support structures) beneath the top plate. The support spring system supports the top plate over the stationary structure and permits it to conform to the various distortions, misalignments and excursions described above. One such support system provides one or more springs that support the top plate, but which permit it to flex in response to the out-of-flatness distortions, and one or more springs to permit the top plate to move axially along the axis of rotation of the rotating part.

Once in operation, the gas film between the top plate and the disc inhibits gas flow between the inner and outer regions of the seal, thus permitting the maintenance of a pressure differential across the seal face. To prevent gas flow around the top plate, a seal must be established between the seal structure and the stationary member on which it is mounted. This is achieved by providing a seal ring around the inner or outer circumference of the top plate, and between the face seal and the stationary structure. Such an arrangement is illustrated in FIG. 1, wherein labyrinth ring seals are secured around the inner edges of the top plates and bear against groove walls in the stationary structure. Optionally, the seal assembly can be mounted in a case. In such case, a seal ring is positioned between the case and the top plate, and the case is mounted on the stationary member in a manner that prevents gas flow between the case and the stationary member.

Figure 2A:
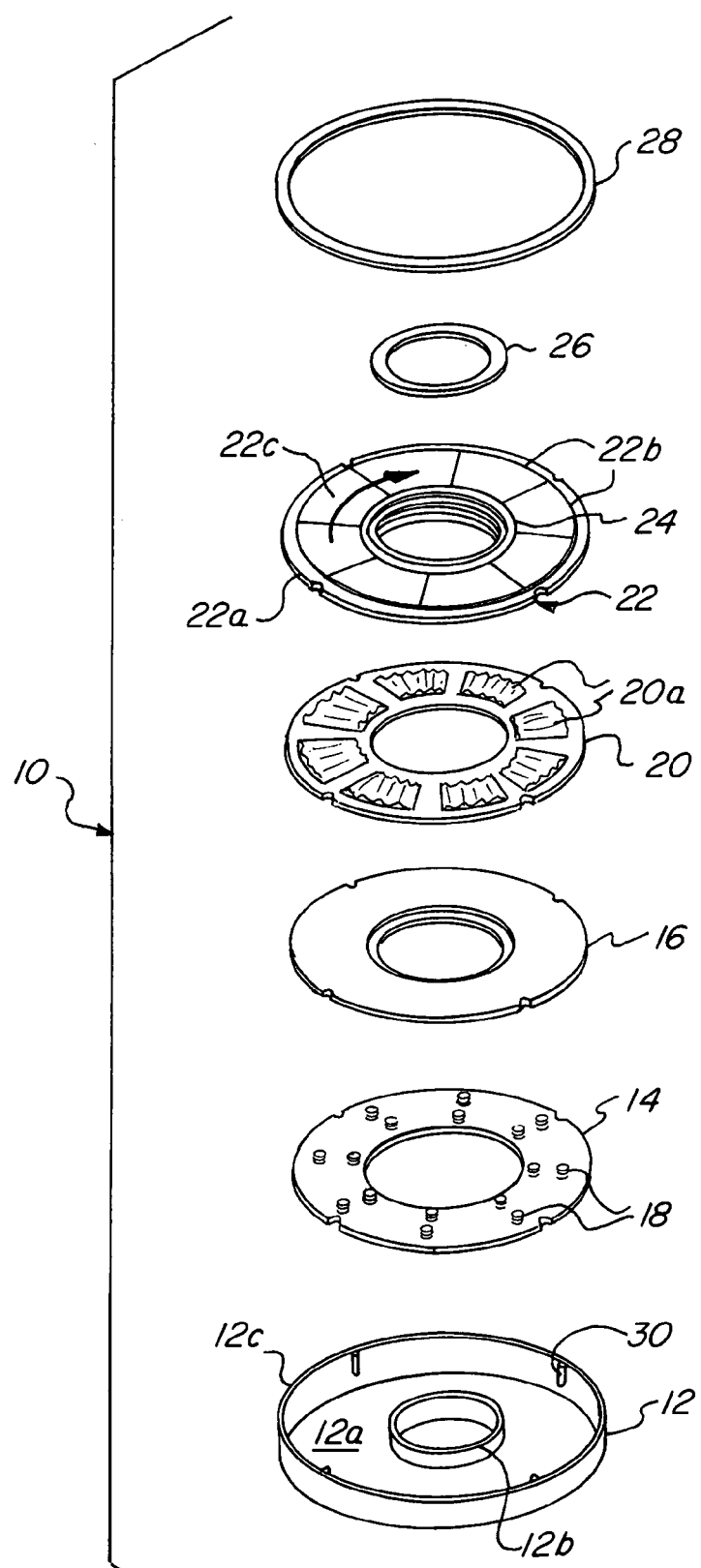
FIG. 2A is an exploded perspective view of a face seals according to one embodiment of the present invention.

A first embodiment of a face seal according to this invention is shown in the exploded perspective view of FIG. 2A and in the cross-sectional view of FIG. 2B. Referring now to both FIGS. 2A and 2B, seal 10 having a diameter of about 12 centimeters (cm) (4.7 inches) comprises an annular face seal case 12, a spring base plate 14, a support plate 16, springs 18, a bump plate 20, a top plate 22 and a seal ring 24. Seal 10 also comprises two retaining rings, an inner retaining ring 26 and an outer retaining ring 28.

Face seal case 12 defines a flat face 12*a* and two concentric flanges, including an inner flange 12*b* having an interior diameter of about 4.1 cm (1.6 inches) and a thickness of about 0.63 millimeters (mm) (0.025 inch) and an outer flange 12*c*. In the orientation shown in FIGS. 2A and 2B, outer flange 12*c* rises to a greater height than inner flange 12*b* relative to face 12*a* by about 2.54 mm (0.1 inch). Together, face 12*a* and flanges 12*b* and 12*c* define an annular channel within which the other structures of this particular embodiment are disposed. The exterior of case 12 is smooth and configured so that when mounted on a stationary structure a physical seal is easily formed between the stationary structure and the case.

Spring base plate 14 is annular in configuration and rests directly on face 12*a* within flanges 12*b* and 12*c*. The support spring system of this embodiment comprises a plurality of springs 18 (referred to herein as "secondary springs") mounted on spring base plate 14 to support a support plate 16 in spaced relation to spring base plate 14. Springs 18 are configured to bear the expected axial load and to accommodate the expected axial excursions set forth in Table I above. The support spring system also comprises the annular bump plate 20, which is mounted on support plate 16. Bump plate 20 carries a plurality of primary springs 20a mounted thereon. Primary springs 20a can be mounted on the underside of plate 20 and bear against supporting plate 16 or on the top side of plate 20 (as shown) and bear against top plate 22. In the illustrated embodiment, primary springs 20a are in the form of corrugated metal sector-shaped coupons that are configured to occupy annular sectors of bump plate 20 and are each secured to plate 20b at one edge thereof Springs 20a are configured to bear the expected axial load and to accommodate out-of-flatness deviations indicated in Table I. For this purpose, the corrugations flatten somewhat in response to pressure from top plate 22 and thus provide a spring-like cushioning effect.

Annular top plate 22 is mounted on the bump plate 20 and seal ring 24 is disposed therein. Seal ring 24 establishes a seal between top plate 22 and case 12 and, in the illustrated embodiment, is configured to provide a labyrinth seal at inner flange 12b, but other types of seal may be used in its place, e.g., a bush seal, a metal o-ring, a segmented tilt pad seal (as shown, e.g., in the article by J. Munson, D. Grant and G. Agrawal "Foil Face Seal Development", AIAA 2001-3483 presented at the 37th AIAA/ASME/SAE/ASEE Joint Propulsion Conference, Jul. 8-11, 2001, Salt Lake City, Utah). In addition, the seal may be formed about either the inner or the outer circumference of the top plate and the casing. Several keys 30 are situated within case 12, and plates 14, 16, 20 and 22 are all notched to mate with the keys 30 and thus maintain their orientation within face seal case 12 at all times. Outer retaining ring 28 retains plates 14, 16, 20 and 22 within face seal case 12.

As seen in FIG. 2B, support plate 16, bump plate 20 and top plate 22 are all configured to be situated between flanges 12b and 12c (i.e., within case 12), and at an offset from the interior of flange 12b. Seal ring 24 is situated within the offset between inner flange 12b and top plate 22. Inner retaining ring 26 holds seal ring 24 in place on face seal case 12. Seal ring 24 defines a mounting flange 24a and is configured to overlap supporting plate 16 and thus retain plate 16 in face seal case 12. The seal has an annular configuration that defines an interior region 40 and an exterior region about the outer perimeter of the seal.

The structure of top plate 22 is illustrated in FIG. 3. Top plate 22 has a flat bottom support surface 22d that contacts bump plate 20. The top surface (or "face") of top plate 22, however, is stepped so that the height of the face of top plate 22 relative to the bottom support surface. 22d is generally uniform along any given radius, but it changes in a rotational direction, e.g., as sensed in the rotational direction of arrow 22c (FIG. 2A). The top surface of top plate 22 has a sawtooth-like rotational surface profile in which the overall thickness of the top plate repeatedly decreases quickly and then increases gradually in the direction of arrow 22c. One way this may be achieved is by securing a series of thin, flat, circularly arranged overlapping, sector-shaped pads or scales 22b (FIG. 3) onto a thin, flat, annular top base 22a. The exposed surfaces of pads 22b provide a surface for top plate 22 that has a generally sawtooth-like configuration with an amplitude of about 0.1524 mm (0.006 inch) as sensed moving in a circular pattern about the center of the assembly, as suggested by FIG. 3. Thus, top plate 22 has a generally undulate face surface even when it is not bearing an axial load. In other embodiments, the top plate may have a flat face when not bearing a load, and there may be structures beneath the top plate which, when the top plate bears an axial load, deforms the top plate so that the top surface is no longer flat, thus enabling it to form a gas seal between it and an adjacent rotating surface.

Preferably, the top surface of top plate 22, i.e., the top surfaces of scales 22b, is coated to provide a high-temperature, low-friction surface, to permit contact with a rotating structure with a minimum of wear on the structure and on scales 22b. For example, the surface can be coated with a polyimid, or a ceramic high-temperature material. Alternatively, the disc can be coated if the top plate is not; optionally, both facing surfaces are coated. The coating prevents wear on the parts while they are in contact before the gas film is formed.

In use, bearing 10 may be secured to a section of a gas turbine that faces another and rotates relative to it, e.g., by securing case 12 to a turbine inlet vane with the stepped face of top plate 22 facing the rotor. When seal 10 is concentric with the axis of rotation and other conditions described herein, such as speed of rotation and axial load, are met, a gap will develop between the face seal device and the rotating part (i.e., the rotor), where a thin film of air will be maintained between them. The thin film of air will protect the mating surfaces from wear and will also establish a barrier to the transfer of gases through the gap. As a result, a pressure differential can be maintained between the interior and exterior of the annular face seal device, thus serving a necessary requirement for a bearing in a gas turbine. The primary springs 20a enable the device to accommodate primary deviations in the seal, e.g., misalignments, out-of-flatness, conical distortion and circumferential distortion, while the secondary springs 18 enable the device to tolerate substantial axial movement. The axial movements accommodated by the primary springs and the secondary springs may be expected to differ by up to two orders of magnitude and the springs are chosen accordingly.

A prototype face seal-like the one shown in FIGS. 2A and 2B was tested in a test rig. The test seal had a diameter of about 12.7 cm (5 inches), and included a top plate that had eight pads, each having a thickness of 0.524 mm (0.006 inch). The inner diameter of the top plate measured about 5.97 cm (2.35 inches) and the outer diameter measured about 10.77 cm (4.24 inches) and had a circumference of about 33 cm (13 inches). In the test ring, the face seal was mounted on a non-rotating piston that provided axial load at typical operating levels, and air bearings located the piston shaft radially. A rotatable thrust runner was positioned against the face and was rotated at 60,000 rpm, giving a circumferential velocity of about 335.3 meters/second (1100 feet per second). Various levels of thrust load were applied against the face of the bearing and the bearing was spun up to surface speeds equivalent to those shown in TABLE I and then allowed to coast down. Torque was measured continuously during these tests. The speed at which lift-off occurs, i.e., at which the film of air develops between top plate 22 and the thrust runner, was documented by noting the precipitous change in torque that accompanied lift-off. A family of curves was generated by repeating the same experiment with increased thrust load. These data allow comparisons of film stiffness and load capacity to be made between seals of different design. High film stiffness and load capacity are preferred. The prototypes that have been tested will all support a nominal 10 psi bearing load. The protoyypes that have been tested will all support a nominal 10 psi bearing load.

A face seal according to FIGS. 2A and 2B was tested repeatedly for conical distortion of the top plate of 0.52° and 0.32°. For this purpose, two simulator plates were manufactured to simulate the expected conical distortion between the thrust runner and the face seal. The distortion was created in the top plate by installing the top plate and the bump plate on the simulator plate, which was used instead of the flat support plate 16 in FIG. 2A. The face seal results were compared with flat face seal results for performance and load capacity. Testing was done as described above using the standard flat backing plate before the conical tests and then after the testing was completed. There was no significant difference in torque results. These data show that a face seal bearing device according to this invention will continue to function despite conical distortion. The outcomes of this analysis also indicate that the face seal of this invention has a measured load capacity higher than the 27.25 kg (60.0-pound) maximum test load that was applied. The data obtained from 0.52° and 0.32° conical distortion tests are compared with each other in TABLE II. There are very small differences between the torque values for each applied load.

TABLE II

Comparison of Measured Torque Values at Conical Distortions of 0.52° and 0.32°

| Axial Load (lbs.) | Torque at 0.52° (in-lbs.) | Torque at 0.32° (in-lbs.) |
| --- | --- | --- |
| 10 | 0.35 | 0.31 |
| 20 | 0.47 | 0.40 |
| 30 | 0.64 | 0.61 |
| 40 | 0.84 | 0.75 |

Several more simulator plates were manufactured with circumferential undulation, i.e., deviation from flatness, and were incorporated into face seals as shown in FIGS. 2A and 2B. Testing was conducted as described above with plates that had one wavelength per circumference and an "out-of-flatness" or wave amplitude of 0.2286 mm (0.009 inch) and 0.1016 mm (0.004 inch), and one, one-and-one-half, and two waves per circumference. In all cases, the top plate and bump plate were installed on top of the undulate simulator, which caused the top plate to take on the shape of the simulator plate.

The circumferential undulation test results for the one wavelength per circumference testing are compared with the standard flat test in TABLE III. The thin-film portion of the seal successfully tracked all of the wavy plates. No contact was observed. Torque seemed to decrease slightly as the number of waves increased, but this was a minor effect. The data are set forth in Table III.

TABLE III

Torque Values at Normal and 0.2286 mm (0.009 Inch) and 0.1016 mm (0.004 Inch) Out of Flatness

| Axial Load (lbs.) | Torque (in-lbs) Cir. Out-of-Flatness 0.2286 mm (0.009 inch) | Torque (in-lbs) Cir. Out-of-Flatness 0.1016 mm (0.004 inch) | Torque From Normal Test (in-lbs.) |
| --- | --- | --- | --- |
| 10 | 0.256 in-lbs. | 0.218 in-lbs. | 0.320 |
| 20 | 0.1755 | 0.148 | 0.432 |
| 30 | 0.277 | 0.270 | 0.510 |
| 40 | 0.351 | 0.351 | 0.620 |
| 50 | 0.410 | 0.425 | 0.680 |

The data of Table III show that by making at least a portion of the seal, e.g., the top plate and the bump plate, the seal can be made to track very large distortions of the rotating mating ring relative to prior art film riding face seal technology, e.g., distortion levels that are more than two orders of magnitude greater than what conventional face seal bearing can tolerate. The torque readings for the circumferentially undulate tests are lower in both cases than for the standard flat plates. This can be explained if the assumption is made that more of the axial load is being carried by the peak areas of the undulation. The average film thickness therefore is increased and, since torque is inversely proportional to the third power of film thickness, one would expect a decrease in torque with an increase in average film thickness. In general, reduced torque is welcomed because it indicates that greater loads can be sustained. However, as load (and torque) increase, the minimum film thickness at the peaks of the undulations decreases and eventually, asperities on the facing surfaces will contact and wear will result. Another disadvantage is that the leakage from the seal will also increase since this is also proportional to film thickness.

The seals of this invention are believed to offer several advantages over prior art face seals. For example, segmentation of the top plate surface by the use of pads allows the manufacture of seals of various sizes because the number and orientation of pads being used can be varied to suit the size of the top plate without influencing the performance of any particular segment. For example, FIG. 4 illustrates a top plate 122 having two concentric arrangements of pads, an outer ring of pads 122b, and an inner ring of pads 122b', on a top base 122a.

Figure 4:
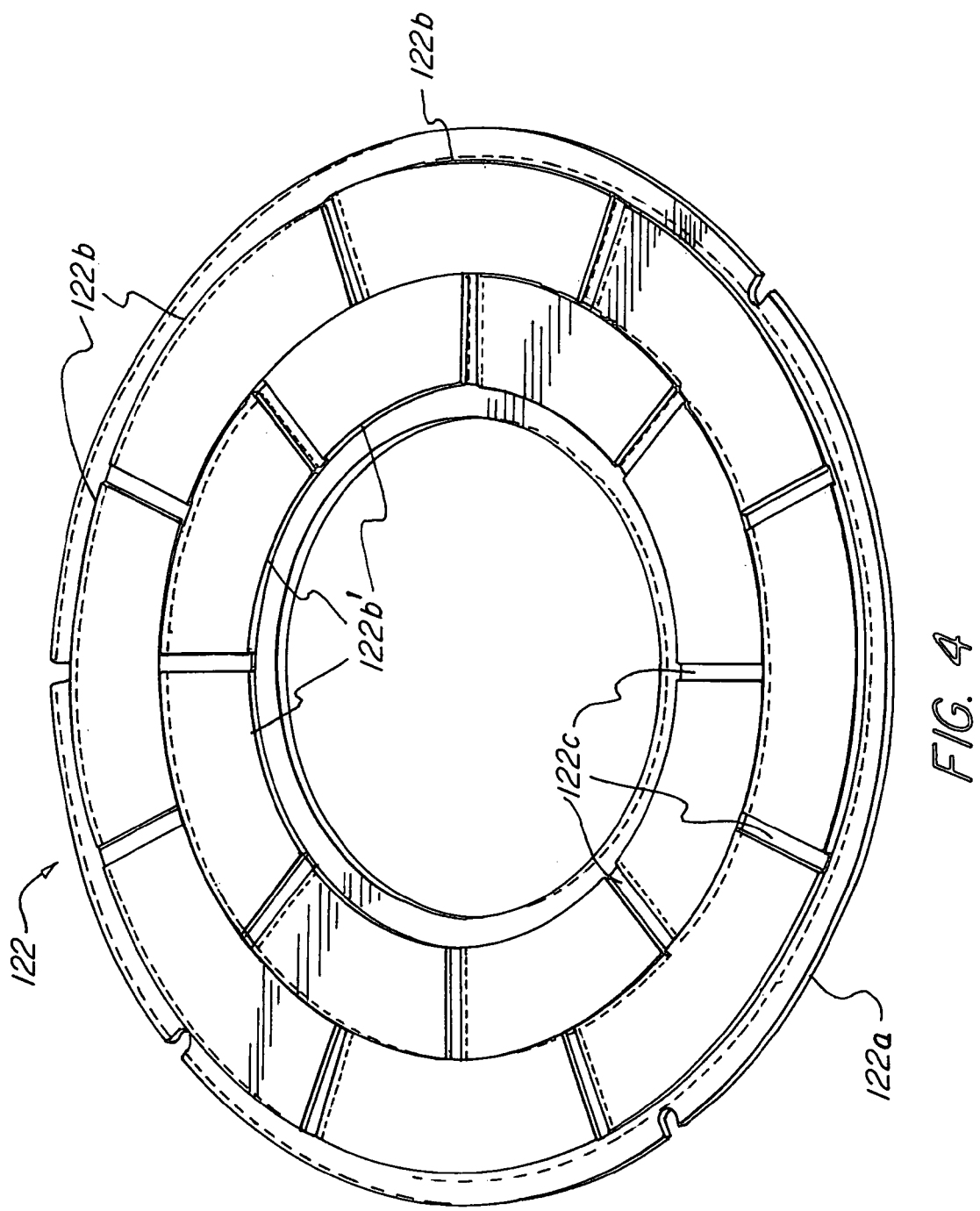
FIG. 4 illustrates an alternative embodiment of a top plate for a face seals according to this invention.

FIG. 4 also illustrates a top plate 122 that comprises pads that do not overlap, but which nonetheless yield a generally undulate seal face because the pads are situated to leave grooves 122c between them.

Some advantages of this invention are that the seal is relatively lightweight since most of it is constructed of sheet metal; it is relatively inexpensive since it is constructed primarily of readily available sheet metal and it is not necessary to manufacture fine groove features to generate lift since the pads distort to create lift on their own; it should be relatively robust since there are no fine features to clog in service; and there are no limitations on increasing the size of the seal to diameters required for the turbine rim locations. The ability of the pads to rise from the top base allows the seal to respond locally to local distortions in the air film due to changes in operating conditions, foreign objects in the film, etc.

Advantages of this invention include the ability of the seal to track circumferential out of roundness; the ability to easily scale the design by simply adding or subtracting segments; the lack of need for fine geometry to generate lift using the tilt pad concept; and superior robustness of the seal since there would be no fine geometry features that could wear or become clogged in service.

Although the invention has been described with reference to particular disclosed embodiments, it will be understood by one of skill in the art, upon a reading and understanding of the foregoing disclosure, that numerous alterations and variations to the disclosed embodiments can be made and are intended to fall within the scope and spirit of the invention as defined in the appended claims.

The invention claimed is:

1. In a gas riding annular face seal for mounting between a first structure and an adjacent second structure so that the annular face seal separates a first region from a second region, at least one of the structures being rotatable relative to the other, the improvement comprising:

the face seal comprises a flexible annular top plate for mounting on such first structure; the top plate having an undulate face surface, at least when such structures are rotating relative to each other, for generating a riding gas film between the top plate and such second structure, the top plate (a) being sufficiently flexible to be compliant to out-of-flat distortions between the first and second relatively rotating structures, and (b) having a plurality of sector plates on the face surface;

a support spring system for rendering the top plate compliant to out-of-flat distortions and axial excursions between the rotating structures while maintaining the riding gas film; and a seal ring positioned between the top plate and the structure on which the face seal is mounted to establish a barrier to gas flow across the face seal, whereby the face seal is able to maintain a pressure differential between the first and second regions.

2. The face seal of claim 1 wherein the seal ring is secured to the top plate.

3. The face seal of claim 2 wherein the first structure is a stationary structure and the second structure is rotatable.

4. The face seal of claim 1 wherein the seal ring comprises a labyrinth seal.

5. The face seal of claim 1 wherein the support spring system comprises a primary spring system for accommodating out-of-flat distortions, and a secondary spring system for accommodating axial excursions.

6. The face seal of claim 5 wherein the support spring system comprises a support plate having two sides, wherein the primary spring system is on one side of the support plate, and the secondary spring system is on the other side of the support plate from the primary spring system.

7. The face seal of claim 6 wherein the primary spring system is between the top plate and the support plate.

8. The face seal of claim 5 wherein the top plate comprises a low-friction, low-wear surface.

9. The face seal of any one of claims 1, 2, 4 or 5 wherein the plurality of sector plates on the face surface overlap each other to provide an undulate surface even when neither of such first and second structures are rotating.

10. The face seal of claim 9 wherein the sector plates are hingedly attached to the top plate.

11. The face seal of claim 1 wherein the top plate is flat when at rest, and wherein the seal is configured to allow the top plate to deform into a non-flat configuration when such structures are rotating relative to each other.

12. The face seal of any one of claims 1, 2, 4 or 5 wherein the plurality of sector plates on the face surface are spaced from one another to define grooves between them to provide an undulate surface even when neither of such first and second structures are rotating.

13. The face seal of any one of claims 1, 2, 4 or 5 wherein the seal is mounted on such first structure adjacent to such second structure, and the first structure is a stationary structure and the second structure is rotatable.

14. The face seal of any one of claims 1, 2, 4 or 5 wherein the seal is mounted on such first structure adjacent to such second structure, and the first structure is rotatable.

15. In a gas riding annular face seal for mounting between a first structure and an adjacent second structure so that the annular face seal separates a first region from a second region, at least one of the structures being rotatable relative to the other, the improvement comprising:

the face seal comprises a flexible annular top plate for mounting on such first structure, and a seal ring positioned to seal the face seal against gas flow across the face seal; the top plate having an undulate face surface, at least when such structures are rotating relative to each other, for generating a riding gas film between the top plate and such second structure, the top plate (a) being sufficiently flexible to be compliant to out-of-flat distortions between the first and second relatively rotating structures, and (b) having a plurality of sector plates on the face surface; and a support spring system for rendering the top plate compliant to out-of-flat distortions and axial excursions between the rotating structures while maintaining the riding gas film, the support spring system comprising a primary spring system for accommodating out-of-flat distortions, and a secondary spring system for accommodating axial excursions; and a case which is dimensioned and configured for being sealingly mounted onto such first structure, and within which the top plate, the primary spring system, and the secondary spring system are mounted, and wherein the seal ring establishes a seal between the top plate and the case, whereby the face seal is able to maintain a pressure differential between the first and second regions.

16. A method for maintaining a pressure differential across a gas riding annular face seal mounted between a first structure and an adjacent second structure to separate a first region containing gas at a first pressure from a second region containing gas at a second pressure which is different from the first pressure, the face seal comprising (a) a flexible annular top plate mounted on a first structure which is adjacent to a second structure, at least one of the structures being rotatable relative to the other; the top plate having an undulate face surface, at least when the structures are rotating relative to each other, for generating a riding gas film between the top plate and the second structure, the top plate (i) being sufficiently flexible to be compliant to out-of-flat distortions between the first and second relatively rotating structures, and (ii) having a plurality of sector plates on the face surface; (c) a support spring system for rendering the top plate compliant to out-of-flat distortions and axial excursions between the rotating structures while maintaining the riding gas film; and (d) a seal ring positioned between the top plate and the structure on which the face seal is mounted to establish a baffler to gas flow across the face seal, whereby the face seal is able to maintain a pressure differential between the first and second regions, the method comprising: rotating at least one of the first and second structures relative to each other at a rate at least sufficient to establish and maintain the riding gas film.

17. The method of claim 16 comprising maintaining the first structure stationary and rotating the second structure.

* * * * *